United States Patent
Zhang et al.

(10) Patent No.: US 12,537,760 B2
(45) Date of Patent: Jan. 27, 2026

(54) PACKET FORWARDING METHOD AND APPARATUS, NETWORK DEVICE, AND STORAGE MEDIUM

(71) Applicant: Huawei Technologies Co., Ltd., Shenzhen (CN)

(72) Inventors: Ka Zhang, Beijing (CN); Zhibo Hu, Beijing (CN); Sheng Fang, Beijing (CN); Shuying Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 278 days.

(21) Appl. No.: 18/491,100

(22) Filed: Oct. 20, 2023

(65) Prior Publication Data

US 2024/0048479 A1    Feb. 8, 2024

Related U.S. Application Data

(63) Continuation of application No. PCT/CN2022/085359, filed on Apr. 6, 2022.

(30) Foreign Application Priority Data

Apr. 22, 2021    (CN) .......................... 202110435921.0

(51) Int. Cl.
    *H04L 45/00*    (2022.01)
    *H04L 69/22*    (2022.01)
(52) U.S. Cl.
    CPC .............. *H04L 45/34* (2013.01); *H04L 69/22* (2013.01)
(58) Field of Classification Search
    None
    See application file for complete search history.

(56) References Cited

U.S. PATENT DOCUMENTS

| | | | | |
|---|---|---|---|---|
| 10,764,175 | B1* | 9/2020 | Filsfils | H04L 45/20 |
| 11,533,254 | B2* | 12/2022 | Li | H04L 45/42 |
| 2018/0159802 | A1* | 6/2018 | Bao | H04L 49/9042 |
| 2020/0084147 | A1* | 3/2020 | Gandhi | H04L 43/20 |

(Continued)

FOREIGN PATENT DOCUMENTS

CN    112491713 A    3/2021

OTHER PUBLICATIONS

Clarence Filsfils et al, RFC 8754, IPv6 Segment Routing Header (SRH), Internet Engineering Task Force (IETF), Mar. 2020, total 27 pages.

(Continued)

*Primary Examiner* — Xavier S Wong
(74) *Attorney, Agent, or Firm* — Conley Rose, P.C.

(57) ABSTRACT

A packet forwarding method implemented by a head node, includes receiving a first packet and a second packet, where the first packet is a packet forwarded by using a first network slice, and the second packet is a packet forwarded by using a second network slice; in response to the first packet matching a first segment routing policy, generating a third packet based on the first packet, where the third packet carries slice information of the first network slice and a first SID list; in response to the second packet matching the first segment routing policy, generating a fourth packet based on the second packet, where the fourth packet carries slice information of the second network slice and the first SID list; and forwarding the third packet and the fourth packet.

20 Claims, 4 Drawing Sheets

(56) References Cited

U.S. PATENT DOCUMENTS

| | | |
|---|---|---|
| 2021/0083933 A1 | 3/2021 | Bull et al. |
| 2021/0126831 A1* | 4/2021 | Filsfils .................. H04L 45/50 |
| 2022/0191777 A1* | 6/2022 | Corston-Petrie ...... H04W 76/12 |

OTHER PUBLICATIONS

Clarence Filsfils et al, Network Programming extension: SRv8 uSID instruction draft-filsfils-spring-net-pgm-extension-srv6-usid-10, IETF, Mar. 10, 2021, total 19 pages.

* cited by examiner

| Next header (Next Header) | Extension header length (Hdr Ext Len) | Routing type (Routing Type) | Segments left (SL) |
|---|---|---|---|
| Last entry (Last Entry) | Flags (Flags) | Tag (Tag) | |
| Segment List [0] | | | |
| ... | | | |
| Segment List [n] | | | |

PACKET FORWARDING METHOD AND APPARATUS, NETWORK DEVICE, AND STORAGE MEDIUM

CROSS-REFERENCE TO RELATED APPLICATIONS

This application is a continuation of International Patent Application No. PCT/CN2022/085359 filed on Apr. 6, 2022, which claims priority to Chinese Patent Application No. 202110435921.0 filed on Apr. 22, 2021. The disclosures of the aforementioned applications are hereby incorporated by reference in their entireties.

TECHNICAL FIELD

Embodiments of the present disclosure relate to the field of segment routing, and in particular, to a packet forwarding method and apparatus, a network device, and a storage medium.

BACKGROUND

A segment routing (SR) over Internet Protocol (IP) version 6 (IPv6) (SRv6) technology is a technology in which a forwarding path is deployed at a head node of a network ingress to forward an IPv6 packet. A packet forwarded by using SRv6 carries a segment identifier (SID) list. The SID list includes SIDs of a plurality of nodes, so that the packet can be guided to pass through the plurality of nodes based on a specified forwarding path, thereby implementing packet forwarding.

To adapt to different network application scenarios, a physical network of an operator is usually divided into a plurality of virtual networks, which may also be referred to as network slices. Therefore, how to implement packet forwarding by using the network slice and SRv6 becomes an urgent problem to be resolved currently.

SUMMARY

Embodiments of the present disclosure provide a packet forwarding method and apparatus, a network device, and a storage medium, so that packet forwarding can be implemented by using a network slice, and usability of combining a segment routing policy and the network slice can be improved. Technical solutions are as follows.

According to a first aspect, a packet forwarding method is provided. In the method, a head node receives a first packet, where the first packet is a packet forwarded by using a first network slice; and the head node receives a second packet, where the second packet is a packet forwarded by using a second network slice. In response to determining, by the head node, that the first packet matches a first segment routing policy, the head node generates a third packet based on the first packet, where the third packet carries slice information of the first network slice and a first SID list corresponding to the first segment routing policy. In response to determining, by the head node, that the second packet matches the first segment routing policy, the head node generates a fourth packet based on the second packet, where the fourth packet carries slice information of the second network slice and the first SID list. The head node forwards the third packet and the fourth packet. The first segment routing policy indicates a forwarding path that satisfies a first service requirement.

In other words, for packets forwarded by using different network slices, when the two packets match a same segment routing policy, a same forwarding path may be used for forwarding, and a relationship between a network slice and a segment routing policy does not need to be concerned. In other words, slice information of the network slice is decoupled from the segment routing policy, so that limitations of the network slice to a forwarding path indicated by the segment routing policy can be reduced, and usability of combining the segment routing policy and the network slice can be improved. In addition, when a same forwarding path and different network slices are used for packets of different services, the same segment routing policy may be used. This can greatly reduce resource consumption of the segment routing policy, and better use the segment routing policy to loose forwarding paths, to improve reliability of the segment routing policy.

The first packet is a packet of the first service, and the second packet is a packet of a second service. In other words, the first packet and the second packet are packets of two different services.

Network slices may be obtained through division based on different resources, for example, based on bandwidth. In addition, different services may correspond to different resource requirements. Therefore, the two services may need to be forwarded by using different network slices. For example, when bandwidth needed for the first service is different from that needed for the second service, a network slice used to forward the packet of the first service is different from a network slice used to forward the packet of the second service.

Generally, one network device includes a plurality of outbound interfaces (physical interfaces), and the plurality of outbound interfaces are in a one-to-one correspondence with a plurality of next-hop devices, in other words, a packet sent through an outbound interface can reach a next-hop device corresponding to the outbound interface. In addition, after a physical network is divided into a plurality of network slices, each outbound interface further corresponds to a plurality of slice sub-interfaces, and the plurality of slice sub-interfaces are in a one-to-one correspondence with the plurality of network slices. In this way, a packet sent through a slice sub-interface corresponding to an outbound interface can reach, by using a network slice corresponding to the slice sub-interface, a next-hop device corresponding to the outbound interface.

Therefore, an implementation process of forwarding the third packet by the head node includes: The head node determines, based on the first SID list, an outbound interface corresponding to a next-hop node, determines, based on the slice information of the first network slice from a plurality of slice sub-interfaces corresponding to the outbound interface, a slice sub-interface corresponding to the first network slice, and forwards the third packet to the next-hop node through the determined slice sub-interface.

In other words, the head node stores a mapping relationship between a SID and an interface identifier of the outbound interface, and stores a mapping relationship between the slice information and an interface identifier of the slice sub-interface. In this way, the head node may determine, from the first SID list, a SID corresponding to the next-hop node, and then determine, based on the SID corresponding to the next-hop node and based on the stored mapping relationship between the SID and the interface identifier of the outbound interface, the outbound interface corresponding to the next-hop node. Then, an interface identifier of the slice sub-interface corresponding to the first network slice is determined based on the slice information of the first network slice from the stored mapping relationship between the slice information and the interface identifier of the slice sub-interface. Then, the slice sub-interface corresponding to the first network slice is determined based on the interface identifier of the slice sub-interface corresponding to the first network slice from the plurality of slice sub-interfaces corresponding to the outbound interface corresponding to the next-hop node, and the third packet is forwarded to the next-hop node through the determined slice sub-interface.

A control device may deliver, to a source end device, slice information of a network slice corresponding to the service, or may deliver the slice information to the head node. When the control device delivers, to different devices, the slice information of the network slice corresponding to the service, manners of generating the third packet by the head node are also different. Therefore, the following describes in detail an implementation process of generating the third packet by the head node in two cases.

In a first case, the control device delivers, to the source end device, the slice information of the network slice corresponding to the service. In this case, the first packet carries the slice information of the first network slice.

In the first case, the first packet includes a first IPv6 packet header and a first extension header. The first extension header is located at an inner layer of the first IPv6 packet header, and the first extension header includes the slice information of the first network slice. In other words, in the first case, the slice information of the first network slice is carried by the first extension header in the first packet.

In this case, the head node may generate the third packet in two implementations. The following separately describes the two implementations.

In a first implementation, the head node inserts a second extension header into an inner layer of the first extension header, and modifies the first IPv6 packet header based on the first SID list, to obtain the third packet, where the second extension header includes the first SID list.

That is, the head node inserts the first SID list into the first packet in an insert manner. Then, to implement hop-by-hop packet forwarding, the first IPv6 packet header further needs to be modified based on the first SID list, to obtain the third packet.

In a second implementation, the head node encapsulates, based on the first SID list and the first IPv6 packet header, a second IPv6 packet header in an inner layer of the first extension header, re-encapsulates the first extension header in an inner layer of the second IPv6 packet header, and encapsulates a second extension header in an inner layer of a re-encapsulated first extension header, to obtain the third packet, where the second extension header includes the first SID list.

That is, the head node inserts the first SID list into the first packet in an encapsulation manner. In this implementation, the second IPv6 packet header is re-encapsulated, and the second IPv6 packet header is modified by using the first SID list. Therefore, the first IPv6 packet header does not need to be modified to obtain the third packet.

In a second case, the control device delivers, to the head node, the slice information of the network slice corresponding to the service. In this case, the first packet does not carry the slice information of the first network slice.

In the second case, the first packet includes a first IPv6 packet header, but does not include a first extension header. In this case, the head node may also generate the third packet in two implementations. The following separately describes the two implementations.

In a first implementation, the head node inserts the first extension header into an inner layer of the first IPv6 packet header, where the first extension header includes the slice information of the first network slice; and inserts a second extension header into an inner layer of the first extension header, and modifies the first IPv6 packet header based on the first SID list, to obtain the third packet, where the second extension header includes the first SID list.

In a second implementation, the head node inserts the first extension header into an inner layer of the first IPv6 packet header, where the first extension header includes the slice information of the first network slice; encapsulates, based on the first SID list and the first IPv6 packet header, a second IPv6 packet header in an inner layer of the first extension header; and re-encapsulates the first extension header in an inner layer of the second IPv6 packet header, and encapsulates a second extension header in an inner layer of a re-encapsulated first extension header, to obtain the third packet, where the second extension header includes the first SID list.

According to a second aspect, a packet forwarding apparatus is provided. The packet forwarding apparatus has a function of implementing behavior in the packet forwarding method in the first aspect. The packet forwarding apparatus includes at least one module, and the at least one module is configured to implement the packet forwarding method provided in the first aspect.

According to a third aspect, a network device is provided. The network device includes a processor and a memory, and the memory is configured to store a computer program for performing the packet forwarding method provided in the first aspect. The processor is configured to execute the computer program stored in the memory, to implement the packet forwarding method provided in the first aspect.

Optionally, the network device may further include a communication bus, and the communication bus is configured to establish a connection between the processor and the memory.

According to a fourth aspect, a computer-readable storage medium is provided. The storage medium stores instructions, and when the instructions are run on a computer, the computer is enabled to perform steps of the packet forwarding method according to the first aspect.

According to a fifth aspect, a computer program product including instructions is provided. When the instructions are run on a computer, the computer is enabled to perform steps of the packet forwarding method according to the first aspect.

Technical effects achieved in the second aspect, the third aspect, the fourth aspect, and the fifth aspect are similar to technical effects achieved by a corresponding technical method in the first aspect.

The technical solutions provided in embodiments of the present disclosure can bring at least the following beneficial effects:

In embodiments of the present disclosure, for packets forwarded by using different network slices, when the two packets match a same segment routing policy, a same forwarding path may be used for forwarding, and a relationship between a network slice and a segment routing policy does not need to be concerned. In other words, slice information of the network slice is decoupled from the segment routing policy, so that limitations of the network slice to a forwarding path indicated by the segment routing policy can be reduced, and usability of combining the segment routing policy and the network slice can be improved.

DESCRIPTION OF EMBODIMENTS

To make the objectives, technical solutions, and advantages of embodiments of the present disclosure clearer, the following further describes implementations of the present disclosure in detail with reference to the accompanying drawings.

An SRv6 technology is: A SID list is inserted into an IPv6 packet, and each node uses the SID list to continuously update a destination address in an IPv6 packet header, to complete hop-by-hop packet forwarding. The SID list includes a plurality of SIDs, the plurality of SIDs identify a plurality of nodes on a forwarding path of the packet, and the SID list may be carried in the packet in a form of an extension header. That is, an extension header is inserted into the packet, and the extension header includes the SID list.

Figure 1:
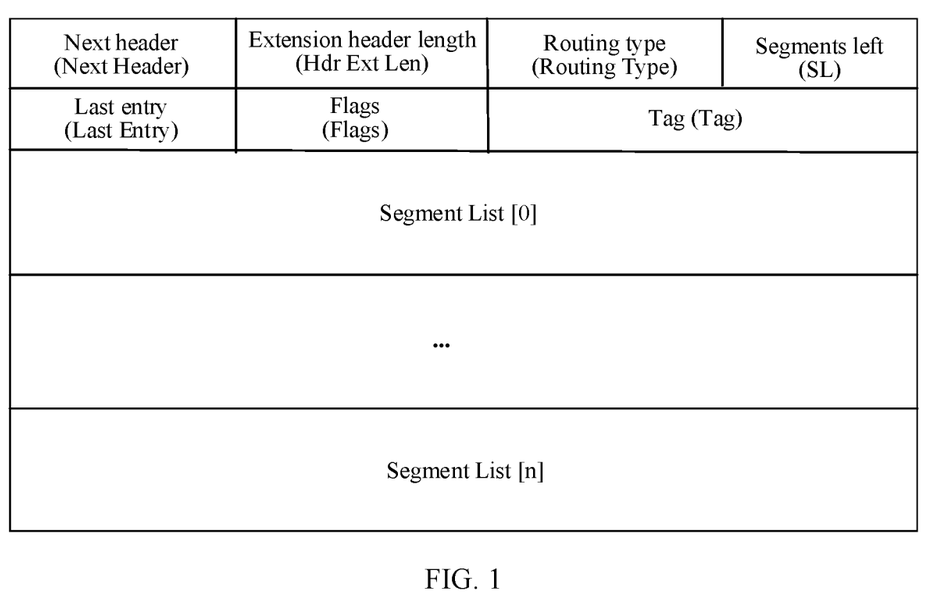
FIG. 1 is a schematic diagram of a structure of a segment routing header (SRH) extension header according to an embodiment of the present disclosure.

In embodiments of the present disclosure, the extension header used to carry the SID list may be an SRH. A possible SRH extension header structure is shown in FIG. 1, and a key field in the SRH extension header structure is described herein.

1. Next header, eight bits, identifying a type of a packet header immediately following an SRH extension header.
2. Extension header length (Hdr Ext Len), eight bits, indicating a length of an SRH excluding the first eight bytes (the first eight bytes are of a fixed length).
3. Routing type, eight bits, having a value of 4, and indicating that a current extension header is an SRH extension header.
4. Segments left (SL), eight bits, indicating a quantity of intermediate nodes that are still to be accessed before a tail node is reached.
5. Last entry, eight bits, indicating that a segment list includes an index of a last element of the segment list.
6. Flags, eight bits, indicating some identifiers of a data packet.
7. Tag, 16 bits, identifying data packets in a same group.
8. SID list (Segment List [0] to Segment List [n]): 128 bits. The SID list is encoded from a last segment of a forwarding path. Segment List is in a form of an IPv6 address.

Segment List [0] indicates the last node on the forwarding path, that is, the tail node. Segment List [1] indicates a penultimate node on the forwarding path. Segment List [n-1] indicates the second node on the forwarding path. Segment List [n] indicates the first node on the forwarding path, that is, a head node.

When the SRH extension header carries the SID list, in a forwarding process of the packet, each time the packet passes through a node, the node modifies a destination address in an IPv6 packet header of the packet to a SID of a next-hop node based on the SID list and decreases the SL field in the SRH extension header by 1. In other words, in SRv6, the destination address in the IPv6 packet header identifies only the next-hop node of the current packet. The destination address constantly changes and is not fixed. The destination address in the IPv6 packet header is jointly determined by the SL field in the SRH extension header and the SID list. For example, if a value of the SL field is n, a value of the destination address in the IPv6 packet header is a value of Segment List [n]. If the value of the SL field is n-1, the value of the destination address in the IPv6 packet header is a value of Segment List [n-1]. If the value of the SL field is 1, the value of the destination address in the IPv6 packet header is a value of Segment List [1]. If the value of the SL field is 0, the value of the destination address in the IPv6 packet header is a value of Segment List [0].

Figure 2:
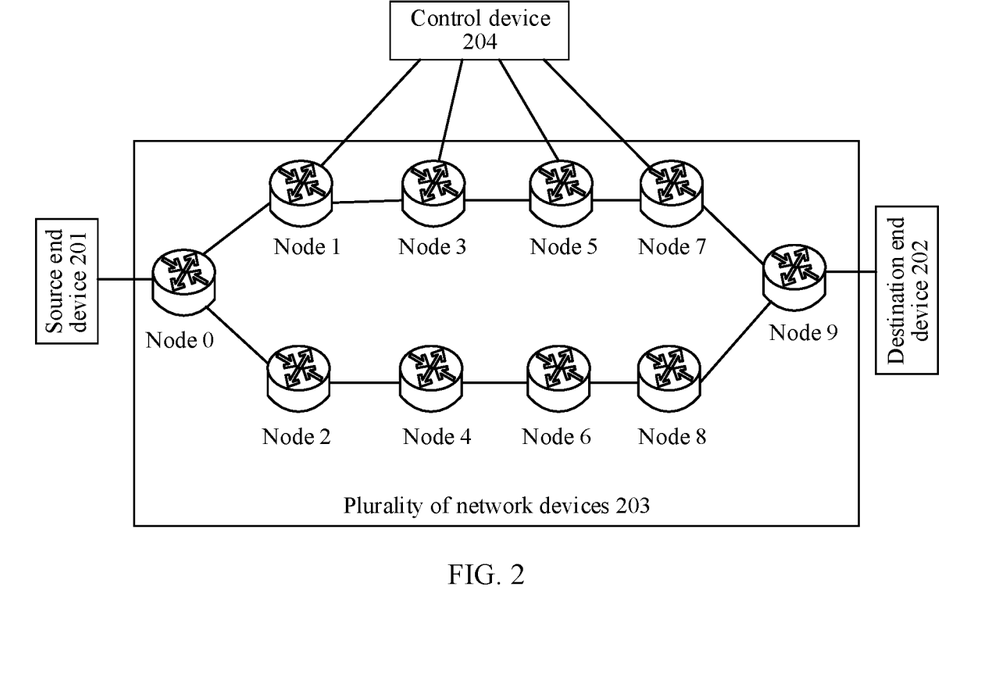
FIG. 2 is a schematic diagram of an implementation environment according to an embodiment of the present disclosure.

FIG. 2 is a schematic diagram of an implementation environment according to an embodiment of the present disclosure. The implementation environment includes a source end device 201, a destination end device 202, a plurality of network devices 203, and a control device 204. The source end device 201 and the destination end device 202 communicate with each other via a part or all of the plurality of network devices 203. The plurality of network devices 203 include a head node, an intermediate node, and a tail node. The head node, the intermediate node, and the tail node are communicatively connected to the control device 204 separately. In FIG. 2, a node 0 is the head node, a node 9 is the tail node, and other nodes are the intermediate node. In addition, in FIG. 2, only a part of network devices 203 are connected to the control device 204, and not all network devices 203 are connected to the control device 204.

A network formed by the plurality of network devices 203 is a physical network of an operator. To adapt to different network application scenarios, the physical network of the operator is usually divided into a plurality of virtual networks, which may also be referred to as network slices. Each network slice is obtained through division based on different resources, for example, based on bandwidth, to flexibly adapt to different network application scenarios. Refer to FIG. 2. It is assumed that the physical network of the operator is divided into three network slices. In FIG. 2, a path of the node 0→a node 1→a node 3→a node 5→a node 7→the node 9 covers three network slices, a path of the node 0→a node 2→a node 4→a node 6→a node 8→the node 9 also covers three network slices, a packet may be forwarded by using any network slice of the three network slices. The network slice is not shown in FIG. 2.

The control device 204 is configured to: receive device information reported by each network device 203, to collect network topology information; and manage a slice subinterface included in an outbound interface of each network device 203. The control device 204 is further configured to determine a segment routing policy (an SRv6 Policy) and slice information of a network slice corresponding to each service. The control device 204 is further configured to:

deliver the determined segment routing policy to head nodes included in the plurality of network devices 203, and deliver the slice information of the network slice corresponding to each service to the source end device 201 or the head nodes included in the plurality of network devices 203.

The source end device 201 is configured to send a packet in a form of IPv6. The head node is configured to determine, based on the received packet, a segment routing policy and a network slice. Then, the head node, the intermediate node, and the tail node all may forward the packet by using the network slice based on a SID list corresponding to the segment routing policy and based on the foregoing method, until the packet reaches the destination end device 202.

The segment routing policy is globally and uniquely identified by using <a head node identifier, a color, and a tail node identifier>. In addition, the color can be associated with one or more service requirement templates, for example, low latency, small jitter, or a low packet loss rate. A forwarding path indicated by the segment routing policy can be determined based on the color. In other words, a color in the segment routing policy can indicate a service requirement corresponding to the forwarding path indicated by the segment routing policy. For example, a service requirement template associated with the color in the segment routing policy is a low latency template, it indicates that latency of forwarding a packet through the forwarding path indicated by the segment routing policy is low.

It should be noted that, the source end device 201 and the destination end device 202 may be a network device configured to process a service, for example, a customer edge router. The network device 203 may be an operator network device. For example, the head node may be an operator edge router.

Figure 3:
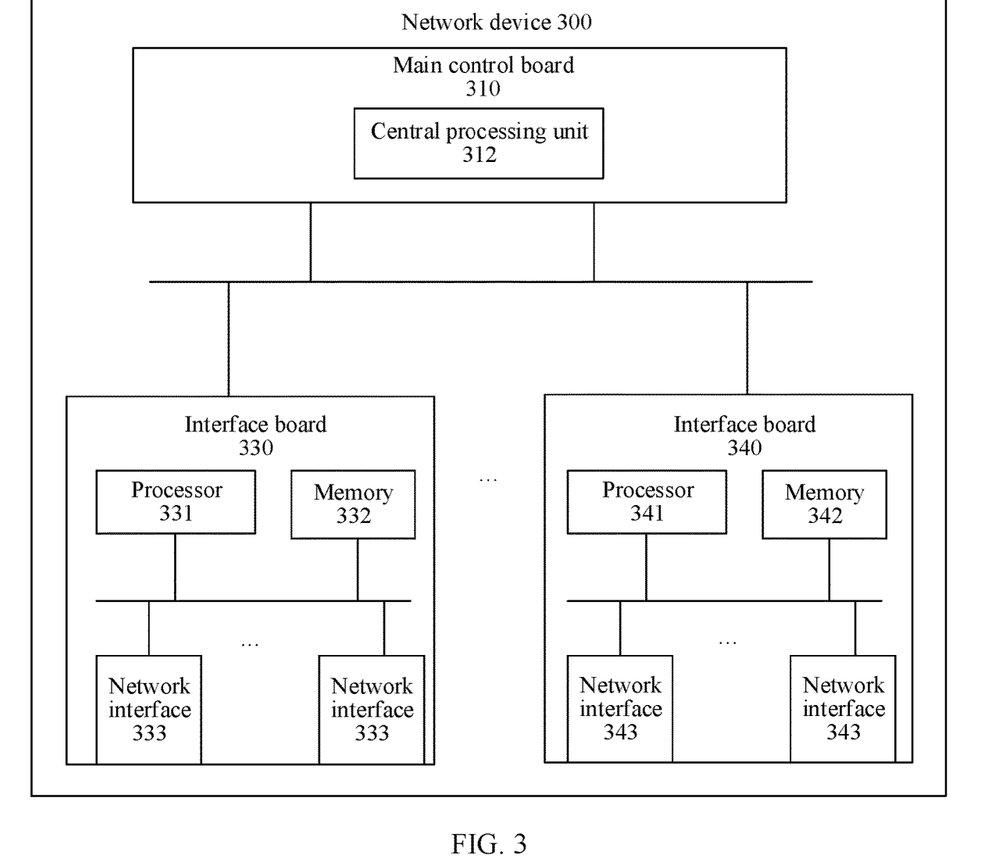
FIG. 3 is a schematic diagram of a structure of a network device according to an embodiment of the present disclosure.

Refer to FIG. 3. FIG. 3 is a schematic diagram of a structure of a network device according to an embodiment of the present disclosure. The network device may be the source end device, the destination end device, the head node, the intermediate node, and the tail node shown in FIG. 2. The network device 300 may be a switch, a router, or another network device that forwards a packet. In this embodiment, the network device 300 includes a main control board 310, an interface board 330, and an interface board 340. When there is a plurality of interface boards, a switching board (not shown in the figure) may be included. The switching board is configured to complete data exchange between the interface boards (the interface board is also referred to as a line card or a service board).

The main control board 310 is configured to complete functions such as system management, device maintenance, and protocol processing. The interface board 330 and the interface board 340 are configured to: provide one or more network interfaces, for example, an Ethernet interface, a fast Ethernet (FE) interface, a gigabit Ethernet (GE) interface, or the like, and implement packet forwarding through these interfaces. The main control board 310, the interface board 330, and the interface board 340 are connected to a system backplane through a system bus to implement interworking. The interface board 330 includes one or more processors 331. The processor 331 is configured to: control and manage the interface board, communicate with a central processing unit on the main control board, and perform packet forwarding processing. A memory 332 on the interface board 330 is configured to store a forwarding entry, and the processor 331 forwards a packet by searching the forwarding entry stored in the memory 332. For a packet forwarding process, refer to descriptions of the following embodiments, and details are not described herein.

It may be understood that, as shown in FIG. 3, in this embodiment, the plurality of interface boards is included, and a distributed forwarding mechanism is used. In this mechanism, an operation on the interface board 340 is basically similar to an operation on the interface board 330. For brevity, details are not described again. In addition, it may be understood that the processor 331 and/or a processor 341 on the interface board 330 in FIG. 3 may be dedicated hardware or a chip, for example, a network processor or an application-specific integrated circuit (ASIC), to implement the foregoing functions. This implementation is generally referred to as a manner of using dedicated hardware or a chip for processing on a forwarding plane. In another implementation, the processor 331 and/or the processor 341 also may use a general-purpose processor, for example, a general-purpose central processing unit (CPU), to implement the functions described above.

In addition, it should be noted that, there may be one or more main control boards. When there is a plurality of main control boards, the main control boards may include an active main control board and a standby main control board. There may be one or more interface boards, and a device having a stronger data processing capability provides more interface boards. If there are a plurality of interface boards, the plurality of interface boards can communicate with each other by using one or more switching boards, and the plurality of interface boards can jointly implement load balancing and redundancy backup. In a centralized forwarding architecture, the device may not need the switching board, and the interface board provides a function of processing service data of an entire system. In a distributed forwarding architecture, the device includes the plurality of interface boards. Data exchange between the plurality of interface boards may be implemented by using the switching board, to provide a large-capacity data exchange and processing capability. Therefore, a data access and processing capability of a network device in the distributed architecture is better than that of a device in the centralized architecture. A specific architecture that is to be used depends on a specific networking deployment scenario. This is not limited herein.

In a specific embodiment, the memory 332 may be a read-only memory (ROM), another type of static storage device that can store static information and instructions, a random-access memory (RAM), another type of dynamic storage device that can store information and instructions, an electrically erasable programmable ROM (EEPROM), a compact disc ROM (CD-ROM) or another compact disc storage, an optical disc storage (include a compact disc, a laser disc, an optical disc, a digital versatile disc (DVD), a BLU-RAY™ disc, or the like), a magnetic disk or another magnetic storage device, or any other medium that can be used to carry or store expected program code in a form of instructions or a data structure and that can be accessed by a computer. However, the memory 332 is not limited herein. The memory 332 may exist independently, and is connected to the processor 331 through the communication bus. The memory 332 may be integrated with the processor 331.

The memory 332 is configured to store program code for performing the solutions of the present disclosure. The processor 331 may execute the program code stored in the memory 332 to control execution, to implement a packet forwarding method provided in the following embodiment in FIG. 4. The program code stored in the memory 332 may include one or more software modules. The one or more software modules may be a software module provided in the following embodiment in FIG. 7.

Figure 4:
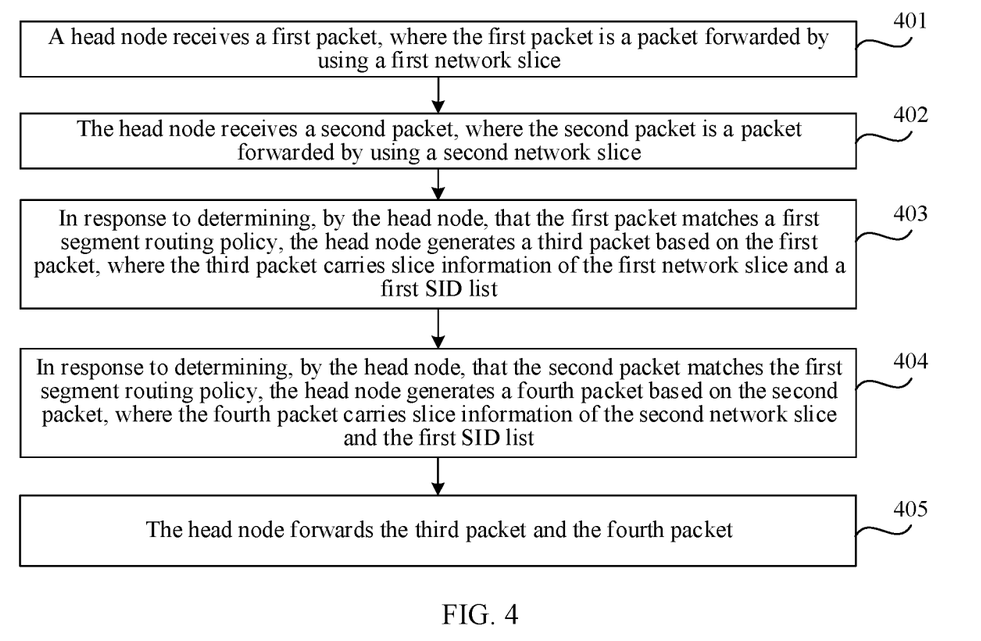
FIG. 4 is a flowchart of a packet forwarding method according to an embodiment of the present disclosure.

FIG. 4 is a flowchart of a packet forwarding method according to an embodiment of the present disclosure. The method includes the following steps.

Step 401: A head node receives a first packet, where the first packet is a packet forwarded by using a first network slice.

Step 402: The head node receives a second packet, where the second packet is a packet forwarded by using a second network slice.

The first packet is a packet of a first service, and the second packet is a packet of a second service. In other words, the first packet and the second packet are packets of two different services.

Based on the foregoing descriptions, network slices may be obtained through division based on different resources, for example, based on bandwidth. In addition, different services may correspond to different resource requirements. Therefore, the two services may need to be forwarded by using different network slices. For example, when bandwidth needed for the first service is different from that needed for the second service, a network slice used to forward the packet of the first service is different from a network slice used to forward the packet of the second service.

Step 403: In response to determining, by the head node, that the first packet matches a first segment routing policy, the head node generates a third packet based on the first packet, where the third packet carries slice information of the first network slice and a first SID list corresponding to the first segment routing policy, and the first segment routing policy indicates a forwarding path that satisfies a first service requirement.

Based on the foregoing descriptions, the segment routing policy is globally and uniquely identified by using <a head node identifier, a color, and a tail node identifier>. The color can be associated with one or more service requirement templates. A forwarding path indicated by the segment routing policy can be determined based on the color. In addition, a service requirement such as a network connectivity requirement can be defined by using the color for a service. Therefore, the head node may match a color of the first service to which the first packet belongs with a color of a locally stored segment routing policy, to determine the first segment routing policy from the locally stored segment routing policy. The first segment routing policy is a segment routing policy that can satisfy a service requirement of the first service when a packet is forwarded through an indicated forwarding path. That is, the first packet matches the first segment routing policy. In this way, a forwarding path corresponding to a packet of each service can be determined by matching a color of the service with a color of the segment routing policy, and automatic traffic diversion can further be implemented.

Based on the foregoing descriptions, a control device may deliver, to a source end device, slice information of a network slice corresponding to the service, or may deliver the slice information to the head node. When the control device delivers, to different devices, the slice information of the network slice corresponding to the service, manners of generating the third packet by the head node are also different. Therefore, the following describes in detail an implementation process of generating the third packet by the head node in two cases.

In a first case, the control device delivers, to the source end device, the slice information of the network slice corresponding to the service. In this case, the first packet carries the slice information of the first network slice.

In the first case, the first packet includes a first IPv6 packet header and a first extension header. The first extension header is located at an inner layer of the first IPv6 packet header, and the first extension header includes the slice information of the first network slice. In other words, in the first case, the slice information of the first network slice is carried by the first extension header in the first packet.

It should be noted that, the slice information may be a slice identifier, or certainly may be other information that can uniquely identify a network slice. The first extension header may be a hop by hop (HBH) extension header, or certainly may be an extension header of another protocol. This is not limited in this embodiment of the present disclosure.

In this case, the head node may generate the third packet in two implementations. The following separately describes the two implementations.

In a first implementation, the head node inserts a second extension header into an inner layer of the first extension header, and modifies the first IPv6 packet header based on the first SID list, to obtain the third packet, where the second extension header includes the first SID list.

That is, the head node inserts the first SID list into the first packet in an insert manner. Then, to implement hop-by-hop packet forwarding, the first IPv6 packet header further needs to be modified based on the first SID list, to obtain the third packet.

Figure 5:
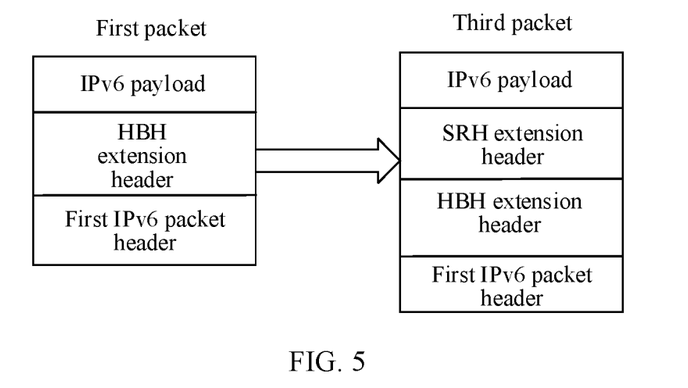
FIG. 5 is a schematic diagram of a packet generation process according to an embodiment of the present disclosure.

For example, refer to FIG. 5. The first packet received by the head node includes a first IPv6 packet header and an HBH extension header. The HBH extension header is located at an inner layer of the first IPv6 packet header. In this case, the head node may insert an SRH extension header into an inner layer of the HBH extension header, and then modify the first IPv6 packet header based on the first SID list, to obtain the third packet.

As an example, the head node may obtain a SID of a next-hop node from the first SID list, and modify a destination address in the first IPv6 packet header to the SID of the next-hop node. For example, when the second extension header is the SRH extension header, the head node may obtain the SID of the next-hop node from the first SID list based on an SL field in the SRH extension header, modifies the destination address in the first IPv6 packet header to the SID of the next-hop node, and decreases the SL field in the SRH extension header by 1.

In a second implementation, the head node encapsulates, based on the first SID list and the first IPv6 packet header, a second IPv6 packet header in an inner layer of the first extension header, re-encapsulates the first extension header in an inner layer of the second IPv6 packet header, and encapsulates a second extension header in an inner layer of a re-encapsulated first extension header, to obtain the third packet, where the second extension header includes the first SID list.

That is, the head node inserts the first SID list into the first packet in an encapsulation manner. In this implementation, the second IPv6 packet header is re-encapsulated, and the second IPv6 packet header is modified by using the first SID list. Therefore, the first IPv6 packet header does not need to be modified to obtain the third packet.

Figure 6:
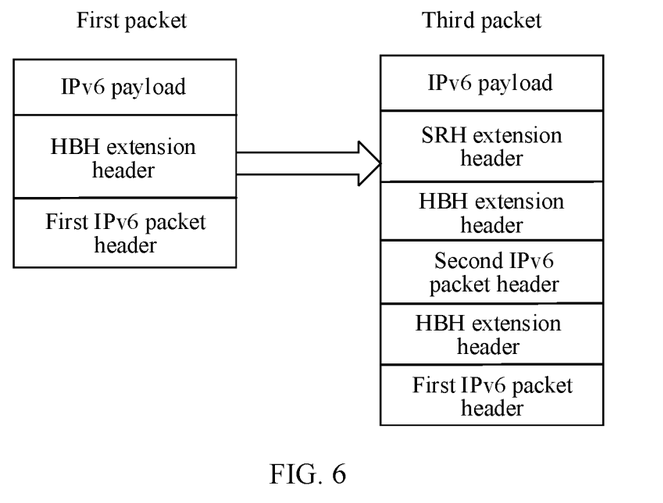
FIG. 6 is a schematic diagram of another packet generation process according to an embodiment of the present disclosure.

For example, refer to FIG. 6. The first packet received by the head node includes a first IPv6 packet header and an HBH extension header, and the HBH extension header is located at an inner layer of the first IPv6 packet header. In this case, the head node may encapsulate the second IPv6 packet header in an inner layer of the HBH extension header, re-encapsulate the HBH extension header in the inner layer of the second IPv6 packet header, and encapsulate an SRH extension header in an inner layer of a re-encapsulated HBH extension header, to obtain the third packet.

As an example, the head node may obtain a SID of a next-hop node from the first SID list, copy the first IPv6 packet header, encapsulate the copied first IPv6 packet header in the inner layer of the first extension header, and modify the copied first IPv6 packet header based on the first SID list, to obtain the second IPv6 packet header. Then, the first extension header is copied, the copied first extension header is encapsulated in the inner layer of the second IPv6 packet header, and the second extension header is encapsulated in the inner layer of the copied first extension header, to obtain the third packet.

For example, when the second extension header is the SRH extension header, the head node may obtain the SID of the next-hop node from the first SID list based on an SL field in the SRH extension header, copy the first IPv6 packet header, encapsulate the copied first IPv6 packet header in the inner layer of the HBH extension header, and modify the destination address in the copied first IPv6 packet header to the SID of the next-hop node, to obtain the second IPv6 packet header. Then, the HBH extension header is copied, the copied HBH extension header is encapsulated in the inner layer of the second IPv6 packet header, then the SRH extension header is encapsulated in the inner layer of the copied HBH extension header, and the SL field in the SRH extension header is decreased by 1, to obtain the third packet.

In a second case, the control device delivers, to the head node, the slice information of the network slice corresponding to the service. In this case, the first packet does not carry the slice information of the first network slice.

In the second case, the first packet includes a first IPv6 packet header, but does not include a first extension header. In this case, the head node may also generate the third packet in two implementations. The following separately describes the two implementations.

In a first implementation, the head node inserts the first extension header into an inner layer of the first IPv6 packet header, where the first extension header includes the slice information of the first network slice; and inserts a second extension header into an inner layer of the first extension header, and modifies the first IPv6 packet header based on the first SID list, to obtain the third packet, where the second extension header includes the first SID list.

The first implementation in the second case is similar to the first implementation in the first case. A difference lies only in that, in the first implementation in the second case, the first extension header needs to be first inserted into the inner layer of the first IPv6 packet header, to encapsulate the slice information of the first network slice in the first packet. Other same steps are not described herein again.

In a second implementation, the head node inserts the first extension header into an inner layer of the first IPv6 packet header, where the first extension header includes the slice information of the first network slice; encapsulates, based on the first SID list and the first IPv6 packet header, a second IPv6 packet header in an inner layer of the first extension header; and re-encapsulates the first extension header in an inner layer of the second IPv6 packet header, and encapsulates a second extension header in an inner layer of a re-encapsulated first extension header, to obtain the third packet, where the second extension header includes the first SID list.

The second implementation in the second case is similar to the second implementation in the first case. A difference lies only in that, in the second implementation in the second case, the first extension header needs to be first inserted into the inner layer of the first IPv6 packet header, to encapsulate the slice information of the first network slice in the first packet. Other same steps are not described herein again.

Step 404: In response to determining, by the head node, that the second packet matches the first segment routing policy, the head node generates a fourth packet based on the second packet, where the fourth packet carries slice information of the second network slice and the first SID list.

An implementation process in which the head node determines the first segment routing policy based on the second packet is similar to a process in which the head node determines the first segment routing policy based on the first packet. This is not described in this embodiment of the present disclosure herein again.

Because the first packet and the second packet match a same segment routing policy, that is, the first segment routing policy, it may indicate that, when the packet is forwarded through the forwarding path indicated by the first segment routing policy, both a service requirement of the first service and a service requirement of the second service can be satisfied. That is, service requirements of the first service and the second service are the same. For example, a low latency requirement needs to be satisfied for both the first service and the second service, a small jitter requirement needs to be satisfied for both the first service and the second service, or a low packet loss rate requirement needs to be satisfied for both the first service and the second service.

In addition, an implementation of generating the fourth packet by the head node is similar to an implementation of generating the third packet by the head node. A difference lies only in that the second packet needs to be forwarded by using the second network slice, and the fourth packet carries the slice information of the second network slice. Therefore, an implementation of generating the fourth packet by the head node is briefly described below. For a detailed implementation process, refer to the descriptions of step 403.

Based on the foregoing descriptions, the control device may deliver, to the source end device, the slice information of the network slice corresponding to the service, or may deliver the slice information to the head node. Therefore, the following describes in detail an implementation process of generating the fourth packet by the head node in two cases.

In a first case, the control device delivers, to the source end device, the slice information of the network slice corresponding to the service. In this case, the second packet carries the slice information of the second network slice.

In the first case, the second packet includes a third IPv6 packet header and a third extension header. The third extension header is located at an inner layer of the third IPv6 packet header, and the third extension header includes the slice information of the second network slice. In other words, in the first case, the slice information of the second network slice is carried by the third extension header in the second packet.

In this case, the head node may generate the fourth packet in two implementations. The following separately describes the two implementations.

In a first implementation, the head node inserts a fourth extension header into an inner layer of the third extension header, and modifies the third IPv6 packet header based on the first SID list, to obtain the fourth packet, where the fourth extension header includes the first SID list.

That is, the head node inserts the first SID list into the second packet in an insert manner. Then, to implement hop-by-hop packet forwarding, the third IPv6 packet header further needs to be modified based on the first SID list, to obtain the fourth packet.

In a second implementation, the head node encapsulates, based on the first SID list and the third IPv6 packet header, a fourth IPv6 packet header in an inner layer of the third extension header, re-encapsulates the third extension header in an inner layer of the fourth IPv6 packet header, and encapsulates a fourth extension header in an inner layer of a re-encapsulated third extension header, to obtain the fourth packet, where the fourth extension header includes the first SID list.

That is, the head node inserts the first SID list into the second packet in an encapsulation manner. In this implementation, the fourth IPv6 packet header is re-encapsulated, and the fourth IPv6 packet header is modified by using the first SID list. Therefore, the third IPv6 packet header does not need to be modified to obtain the fourth packet.

In a second case, the control device delivers, to the head node, the slice information of the network slice corresponding to the service. In this case, the second packet does not carry the slice information of the second network slice.

In the second case, the second packet includes a third IPv6 packet header, but does not include a third extension header. In this case, the head node may also generate the fourth packet in two implementations. The following separately describes the two implementations.

In a first implementation, the head node inserts the third extension header into an inner layer of the third IPv6 packet header, where the third extension header includes the slice information of the second network slice; and inserts a fourth extension header into an inner layer of the third extension header, and modifies the third IPv6 packet header based on the first SID list, to obtain the fourth packet. The fourth extension header includes the first SID list.

In a second implementation, the head node inserts the third extension header into an inner layer of the third IPv6 packet header, where the third extension header includes the slice information of the second network slice; encapsulates, based on the first SID list and the third IPv6 packet header, a fourth IPv6 packet header in an inner layer of the third extension header; and re-encapsulates the third extension header in an inner layer of the fourth IPv6 packet header, and encapsulates a fourth extension header in an inner layer of a re-encapsulated third extension header, to obtain the fourth packet, where the fourth extension header includes the first SID list.

Step 405: The head node forwards the third packet and the fourth packet.

Generally, one network device includes a plurality of outbound interfaces (physical interfaces), and the plurality of outbound interfaces are in a one-to-one correspondence with a plurality of next-hop devices, in other words, a packet sent through an outbound interface can reach a next-hop device corresponding to the outbound interface. In addition, after a physical network is divided into a plurality of network slices, each outbound interface further corresponds to a plurality of slice sub-interfaces, and the plurality of slice sub-interfaces are in a one-to-one correspondence with the plurality of network slices. In this way, a packet sent through a slice sub-interface corresponding to an outbound interface can reach, by using a network slice corresponding to the slice sub-interface, a next-hop device corresponding to the outbound interface.

Therefore, an implementation process of forwarding the third packet by the head node includes: The head node determines, based on the first SID list, an outbound interface corresponding to a next-hop node, determines, based on the slice information of the first network slice from a plurality of slice sub-interfaces corresponding to the outbound interface, a slice sub-interface corresponding to the first network slice, and forwards the third packet to the next-hop node through the determined slice sub-interface.

In other words, the head node stores a mapping relationship between a SID and an interface identifier of the outbound interface, and stores a mapping relationship between the slice information and an interface identifier of the slice sub-interface. In this way, the head node may determine, from the first SID list, a SID corresponding to the next-hop node, and then determine, based on the SID corresponding to the next-hop node and based on the stored mapping relationship between the SID and the interface identifier of the outbound interface, the outbound interface corresponding to the next-hop node. Then, an interface identifier of the slice sub-interface corresponding to the first network slice is determined based on the slice information of the first network slice from the stored mapping relationship between the slice information and the interface identifier of the slice sub-interface. Then, the slice sub-interface corresponding to the first network slice is determined based on the interface identifier of the slice sub-interface corresponding to the first network slice from the plurality of slice sub-interfaces corresponding to the outbound interface corresponding to the next-hop node, and the third packet is forwarded to the next-hop node through the determined slice sub-interface.

An implementation of forwarding the fourth packet by the head node is similar to an implementation of forwarding the third packet by the head node. A difference lies only in that, the fourth packet needs to be forwarded by using the second network slice. Therefore, the following briefly describes the implementation of forwarding the fourth packet by the head node. For a detailed implementation process, refer to the descriptions of forwarding the third packet by the head node.

An implementation process of forwarding the fourth packet by the head node includes: The head node determines, based on the first SID list, an outbound interface corresponding to a next-hop node, determines, based on the slice information of the second network slice from a plurality of slice sub-interfaces corresponding to the outbound interface, a slice sub-interface corresponding to the second network slice, and forwards the fourth packet to the next-hop node through the determined slice sub-interface.

It should be noted that, for an intermediate node, an implementation of forwarding the third packet by the intermediate node is similar to an implementation of forwarding the third packet by the head node. The first implementation is used as an example. It is assumed that the second extension header is the SRH extension header. After receiving the third packet, the intermediate node needs to obtain a SID of a next-hop node from the first SID list of the SRH extension header based on the SL field in the SRH extension header, modify a destination address of an IPv6 packet header in the third packet to the SID of the next-hop node, and decrease the SL field in the SRH extension header by 1. Then, the third packet is forwarded through the slice sub-interface of the first network slice corresponding to the outbound interface of the next-hop node. For a tail node, after receiving the third packet, the tail node needs to pop up the first extension header and the second extension header, and then forward the first extension header and the second extension header to a destination end device. A manner of forwarding the fourth packet is similar.

In embodiments of the present disclosure, for packets forwarded by using different network slices, when the two packets match a same segment routing policy, a same forwarding path may be used for forwarding, and a relationship between a network slice and a segment routing policy does not need to be concerned. In other words, slice information of the network slice is decoupled from the segment routing policy, so that limitations of the network slice to a forwarding path indicated by the segment routing policy can be reduced, and usability of combining the segment routing policy and the network slice can be improved. In addition, when a same forwarding path and different network slices are used for packets of different services, the same segment routing policy may be used. This can greatly reduce resource consumption of the segment routing policy, and better use the segment routing policy to loose forwarding paths, to improve reliability of the segment routing policy.

Figure 7:
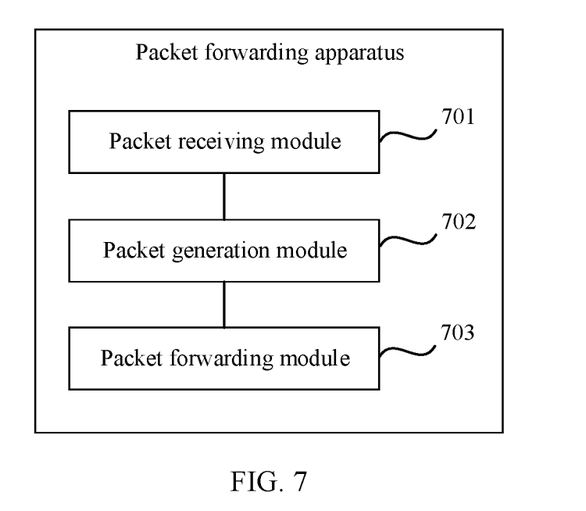
FIG. 7 is a schematic diagram of a structure of a packet forwarding apparatus according to an embodiment of the present disclosure.

FIG. 7 is a schematic diagram of a structure of a packet forwarding apparatus according to an embodiment of the present disclosure. The packet forwarding apparatus may be implemented as a part or all of a network device by using software, hardware, or a combination thereof. The network device may be the head node shown in FIG. 1. Refer to FIG. 7. The apparatus includes a packet receiving module 701, a packet generation module 702, and a packet forwarding module 703.

The packet receiving module 701 is configured to: receive a first packet, where the first packet is a packet forwarded by using a first network slice; and receive a second packet, where the second packet is a packet forwarded by using a second network slice. For a detailed implementation process, refer to the descriptions of step 401 and step 402.

The packet generation module 702 is configured to: in response to the first packet matching a first segment routing policy, generate a third packet based on the first packet, where the third packet carries slice information of the first network slice and a first segment identifier SID list corresponding to a first segment routing policy. The first segment routing policy indicates a forwarding path that satisfies a first service requirement. For a detailed implementation process, refer to the descriptions of step 403.

The packet generation module 702 is further configured to: in response to the second packet matching the first segment routing policy, generate a fourth packet based on the second packet, where the fourth packet carries slice information of the second network slice and the first SID list. For a detailed implementation process, refer to the descriptions of step 404.

The packet forwarding module 703 is configured to forward the third packet and the fourth packet. For a detailed implementation process, refer to the descriptions of step 405.

Optionally, the packet forwarding module 703 is further configured to: determine, based on the first SID list, an outbound interface corresponding to a next-hop node; determine, based on the slice information of the first network slice from a plurality of slice sub-interfaces corresponding to the outbound interface, a slice sub-interface corresponding to the first network slice; and forward the third packet to the next-hop node through the determined slice sub-interface.

Optionally, the first packet carries the slice information of the first network slice.

Optionally, the first packet includes a first internet protocol version 6 IPv6 packet header and a first extension header, the first extension header is located at an inner layer of the first IPv6 packet header, and the first extension header includes the slice information of the first network slice.

The packet generation module 702 is further configured to: insert a second extension header into an inner layer of the first extension header, and modify the first IPv6 packet header based on the first SID list, to obtain the third packet, where the second extension header includes the first SID list.

Optionally, the first packet includes a first IPv6 packet header and a first extension header, the first extension header is located at an inner layer of the first IPv6 packet header, and the first extension header includes the slice information of the first network slice.

The packet generation module 702 is further configured to: encapsulate, based on the first SID list and the first IPv6 packet header, a second IPv6 packet header in an inner layer of the first extension header; and re-encapsulate the first extension header in an inner layer of the second IPv6 packet header, and encapsulate a second extension header in an inner layer of a re-encapsulated first extension header, to obtain the third packet, where the second extension header includes the first SID list.

Optionally, the first packet includes a first IPv6 packet header.

The packet generation module 702 is further configured to: insert a first extension header into an inner layer of the first IPv6 packet header, where the first extension header includes the slice information of the first network slice; and insert a second extension header into an inner layer of the first extension header, and modify the first IPv6 packet header based on the first SID list, to obtain the third packet, where the second extension header includes the first SID list.

Optionally, the first packet includes a first IPv6 packet header.

The packet generation module 702 is further configured to: insert a first extension header into an inner layer of the first IPv6 packet header, where the first extension header includes the slice information of the first network slice; encapsulate, based on the first SID list and the first IPv6 packet header, a second IPv6 packet header in an inner layer of the first extension header; re-encapsulate the first extension header in an inner layer of the second IPv6 packet header, and encapsulate a second extension header in an inner layer of a re-encapsulated first extension header, to obtain the third packet, where the second extension header includes the first SID list.

In embodiments of the present disclosure, for packets forwarded by using different network slices, when the two packets match a same segment routing policy, a same forwarding path may be used for forwarding, and a relationship between a network slice and a segment routing policy does not need to be concerned. In other words, slice information of the network slice is decoupled from the segment routing policy, so that limitations of the network slice to a forwarding path indicated by the segment routing policy can be reduced, and usability of combining the segment routing policy and the network slice can be improved. In addition, when a same forwarding path and different network slices are used for packets of different services, the same segment routing policy may be used. This can greatly reduce resource consumption of the segment routing policy, and better use the segment routing policy to loose forwarding paths, to improve reliability of the segment routing policy.

It should be noted that, when the packet forwarding apparatus provided in the foregoing embodiment forwards a packet, division of the foregoing functional modules is merely used as an example for description. In actual application, the foregoing functions may be allocated to different functional modules for implementation based on requirements, that is, an internal structure of the apparatus is divided into different functional modules, to implement all or a part of the functions described above. In addition, the packet forwarding apparatus provided in the foregoing embodiment and the packet forwarding method embodiment relate to a same concept. For a specific implementation process, refer to the method embodiment.

All or a part of the foregoing embodiments may be implemented by software, hardware, firmware, or any combination thereof. When software is used to implement the embodiments, all or a part of embodiments may be implemented in a form of a computer program product. The computer program product includes one or more computer instructions. When the computer instructions are loaded and executed on a computer, all or a part of the procedures or functions according to embodiments of the present disclosure are generated. The computer may be a general-purpose computer, a dedicated computer, a computer network, or another programmable apparatus. The computer instructions may be stored in a computer-readable storage medium, or transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. It should be noted that, the computer-readable storage medium mentioned in embodiments of the present disclosure may be a non-volatile storage medium, or in other words, may be a non-transitory storage medium.

It should be understood that "a plurality of" mentioned in this specification means two or more. In the descriptions of embodiments of the present disclosure, unless otherwise specified, "/" represents "or". For example, A/B may represent A or B. In this specification, "and/or" describes only an association relationship between associated objects and indicates that there may be three relationships. For example, A and/or B may represent the following three cases: Only A exists, both A and B exist, and only B exists. In addition, to clearly describe the technical solutions in embodiments of the present disclosure, terms such as "first" and "second" are used in embodiments of the present disclosure to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

The foregoing descriptions are embodiments provided in the present disclosure, but are not intended to limit the present disclosure. Any modification, equivalent replacement, or improvement made without departing from the spirit and principle of the present disclosure should fall within the protection scope of the present disclosure.

What is claimed is:

1. A method implemented by a head node, wherein the method comprises:
  receiving a first packet, wherein the first packet is to be forwarded using a first network slice;
  receiving a second packet, wherein the second packet is to be forwarded using a second network slice;
  generating, when first data of a first attribute in the first packet matches second data of a second attribute of a segment routing (SR) policy, a third packet based on the first packet, wherein the first attribute corresponds to the second attribute wherein the third packet carries first slice information of the first network slice and a first segment identifier (SID) list corresponding to the SR policy, and wherein the SR policy indicates a forwarding path that satisfies a first service requirement;
  generating, when third data of a third attribute in the second packet matches the second data of the second attribute of the SR policy, a fourth packet based on the second packet, wherein the third attribute corresponds to the second attribute, and wherein the fourth packet carries second slice information of the second network slice and the first SID list; and
  forwarding the third packet and the fourth packet.

2. The method of claim 1, wherein forwarding the third packet comprises:
  determining based on the first SID list, an outbound interface corresponding to a next-hop node;
  determining, based on the first slice information and from a plurality of slice sub-interfaces corresponding to the outbound interface, a slice sub-interface corresponding to the first network slice; and
  forwarding the third packet to the next-hop node through the slice sub-interface.

3. The method of claim 1, wherein the first packet comprise the first slice information.

4. The method of claim 3, wherein the first packet further comprises a first Internet Protocol version 6 (IPv6) packet header and a first extension header, wherein the first extension header is located at a first inner layer of the first IPv6 packet header, wherein the first extension header comprises the first slice information, and the wherein generating the third packet based on the first packet comprises:
  inserting a second extension header into a second inner layer of the first extension header, wherein the second extension header comprises the first SID list; and
  modifying the first IPv6 packet header based on the first SID list, to obtain the third packet.

5. The method of claim 3, wherein the first packet further comprises a first Internet Protocol version 6 (IPv6) packet header and a first extension header, wherein the first extension header is located at a first inner layer of the first IPv6 packet header, wherein the first extension header comprises the first slice information, and wherein generating the third packet based on the first packet comprises:
  encapsulating, based on the first SID list and the first IPv6 packet header, a second IPv6 packet header in an a second inner layer of the first extension header;
  re-encapsulating the first extension header in a third inner layer of the second IPv6 packet header to produce a re-encapsulated first extension header; and
  encapsulating a second extension header in a fourth inner layer of the re-encapsulated first extension header to obtain the third packet, wherein the second extension header comprises the first SID list.

6. The method of claim 1, wherein the first packet further comprises a first Internet Protocol version 6 (IPv6) packet header, and wherein generating the third packet based on the first packet comprises:

inserting a first extension header into a first inner layer of the first IPv6 packet header, wherein the first extension header comprises the first slice information; and inserting a second extension header into a second inner layer of the first extension header, wherein the second extension header comprises the first SID list; and modifying the first IPv6 packet header based on the first SID list, to obtain the third packet.

7. The method of claim 1, wherein the first packet further comprises a first Internet Protocol version 6 (IPv6) packet header, and wherein generating the third packet based on the first packet comprises:

inserting a first extension header into a first inner layer of the first IPv6 packet header, wherein the first extension header comprises the first slice information;

encapsulating, based on the first SID list and the first IPv6 packet header, a second IPv6 packet header in a second inner layer of the first extension header;

re-encapsulating the first extension header in a third inner layer of the second IPv6 packet header to produce a re-encapsulated first extension header; and encapsulating a second extension header in a fourth inner layer of the re-encapsulated first extension header, to obtain the third packet, wherein the second extension header comprises the first SID list.

8. An apparatus comprising:

memory configured to store instructions; and one or more processors coupled to the memory and configured to execute the instructions to cause the apparatus to:

receive a first packet, wherein the first packet is to be forwarded using a first network slice;

receive a second packet, wherein the second packet is to be forwarded using a second network slice;

generate, when first data of a first attribute in the first packet matches second data of a second attribute of a first segment routing (SR) policy, a third packet based on the first packet, wherein the third packet carries first slice information of the first network slice and a first segment identifier (SID) list corresponding to the first SR policy, wherein the first attribute corresponds to the second attribute, and wherein the first SR policy indicates a forwarding path that satisfies a first service requirement;

generate, when third data of a third attribute in the second packet matches the second data of the second attribute of the first SR policy, a fourth packet based on the second packet, wherein the third attribute corresponds to the second attribute, and wherein the fourth packet carries second slice information of the second network slice and the first SID list; and forward the third packet and the fourth packet.

9. The apparatus of claim 8, wherein the one or more processors are further configured to execute the instructions to cause the apparatus to:

determine, based on the first SID list, an outbound interface corresponding to a next-hop node;

determine, based on the first slice information and from a plurality of slice sub-interfaces corresponding to the outbound interface, a slice sub-interface corresponding to the first network slice; and forward the third packet to the next-hop node through the slice sub-interface.

10. The apparatus of claim 8, wherein the first packet comprises the first slice information.

11. The apparatus of claim 10, wherein the first packet further comprises a first Internet Protocol version 6 (IPv6) packet header and a first extension header, wherein the first extension header is located at a first inner layer of the first IPv6 packet header, and wherein the first extension header comprises the first slice information, and wherein the one or more processors further execute the instructions to cause the apparatus to:

insert a second extension header into a second inner layer of the first extension header, wherein the second extension header comprises the first SID list; and modify the first IPv6 packet header based on the first SID list; to obtain the third packet.

12. The apparatus of claim 10, wherein the first packet further comprises a first Internet Protocol version 6 (IPv6) packet header and a first extension header, wherein the first extension header is located at a first inner layer of the first IPv6 packet header, wherein the first extension header comprises the first slice information, and wherein the one or more processors further execute the instructions to cause the apparatus to:

encapsulate, based on the first SID list and the first IPv6 packet header, a second IPv6 packet header in a second inner layer of the first extension header;

re-encapsulate the first extension header in a third inner layer of the second IPv6 packet header to produce a re-encapsulated first extension header; and encapsulate a second extension header in a fourth inner layer of the re-encapsulated first extension header, to obtain the third packet, wherein the second extension header comprises the first SID list.

13. The apparatus of claim 8, wherein the first packet further comprises a first Internet Protocol version 6 (IPv6) packet header, wherein the one or more processors further execute the instructions to cause the apparatus to:

insert a first extension header into a first inner layer of the first IPv6 packet header, wherein the first extension header comprises the first slice information;

insert a second extension header into a second inner layer of the first extension header, wherein the second extension header comprises the first SID list; and modify the first IPv6 packet header based on the first SID list to obtain the third packet.

14. The apparatus of claim 8, wherein the first packet further comprises a first Internet Protocol version 6 (IPv6) packet header, wherein the one or more processors further execute the instructions to cause the apparatus to:

insert a first extension header into a first inner layer of the first IPv6 packet header, wherein the first extension header comprises the first slice information;

encapsulate, based on the first SID list and the first IPv6 packet header, a second IPv6 packet header in a second inner layer of the first extension header;

re-encapsulate the first extension header in a third inner layer of the second IPv6 packet header to produce a re-encapsulated first extension header; and encapsulate a second extension header in a fourth inner layer of the re-encapsulated first extension header, to obtain the third packet, wherein the second extension header comprises the first SID list.

15. A computer program product comprising instructions that are stored on a computer-readable medium and that, when executed by a processor, cause an apparatus to:

receive a first packet, wherein the first packet is to be forwarded using a first network slice;

receive a second packet, wherein the second packet is to be forwarded using a second network slice;

generate, when first data of a first attribute in the first packet matches second data of a second attribute of a first segment routing (SR) policy, a third packet based on the first packet, wherein the first attribute corresponds to the second attribute, wherein the third packet carries first slice information of the first network slice and a first segment identifier (SID) list corresponding to the first SR policy, and wherein the first SR policy indicates a forwarding path that satisfies a first service requirement;

generate, when third data of a third attribute in the second packet matches the second data of the second attribute of the first SR policy, a fourth packet based on the second packet, wherein the third attribute corresponds to the second attribute, and wherein the fourth packet carries second slice information of the second network slice and the first SID list; and forward the third packet and the fourth packet.

16. The computer program product of claim 15, wherein the instructions; when executed by the processor, further cause the apparatus to:

determine node based on the first SID list, an outbound interface corresponding to a next-hop node;

determine based on the first slice information and from a plurality of slice sub-interfaces corresponding to the outbound interface, a slice sub-interface corresponding to the first network slice; and forward the third packet to the next-hop node through the slice sub-interface.

17. The computer program product of claim 15, wherein the first packet carries the first slice information.

18. The computer program product of claim 17, wherein the first packet further comprises a first Internet Protocol version 6 (IPv6) packet header and a first extension header, wherein the first extension header is located at a first inner layer of the first IPv6 packet header, and wherein the first extension header comprises the first slice information; and wherein the instructions when executed by the one or more processors further cause the apparatus to:

insert a second extension header into a second inner layer of the first extension header, wherein the second extension header comprises the first SID list; and modify the first IPv6 packet header based on the first SID list to obtain the third packet.

19. The computer program product of claim 17, wherein the first packet further comprises a first Internet Protocol version 6 (IPv6) packet header and a first extension header, wherein the first extension header is located at a first inner layer of the first IPv6 packet header, wherein the first extension header comprises the first slice information, and wherein the instructions when executed by the one or more processors further cause the apparatus to:

capsulate based on the first SID list and the first IPv6 packet header, a second IPv6 packet header in a second inner layer of the first extension header;

re-encapsulate the first extension header in a third inner layer of the second IPv6 packet header to produce a re-encapsulated first extension header; and encapsulate a second extension header in a fourth inner layer of the re-encapsulated first extension header, to obtain the third packet, wherein the second extension header comprises the first SID list.

20. The computer program product of claim 15, wherein the first packet further comprises a first Internet Protocol version 6 (IPv6) packet header, and wherein the instructions when executed by the one or more processors further cause the apparatus to:

insert a first extension header into a first inner layer of the first IPv6 packet header, wherein the first extension header comprises the first slice information;

insert a second extension header into a second inner layer of the first extension header, wherein the second extension header comprises the first SID list; and modify the first IPv6 packet header based on the first SID list to obtain the third packet.

\* \* \* \* \*